No. 748,549. PATENTED DEC. 29, 1903.
W. N. WHITE.
FERTILIZER DRILL.
APPLICATION FILED DEC. 26, 1902.
NO MODEL. 2 SHEETS—SHEET 1.
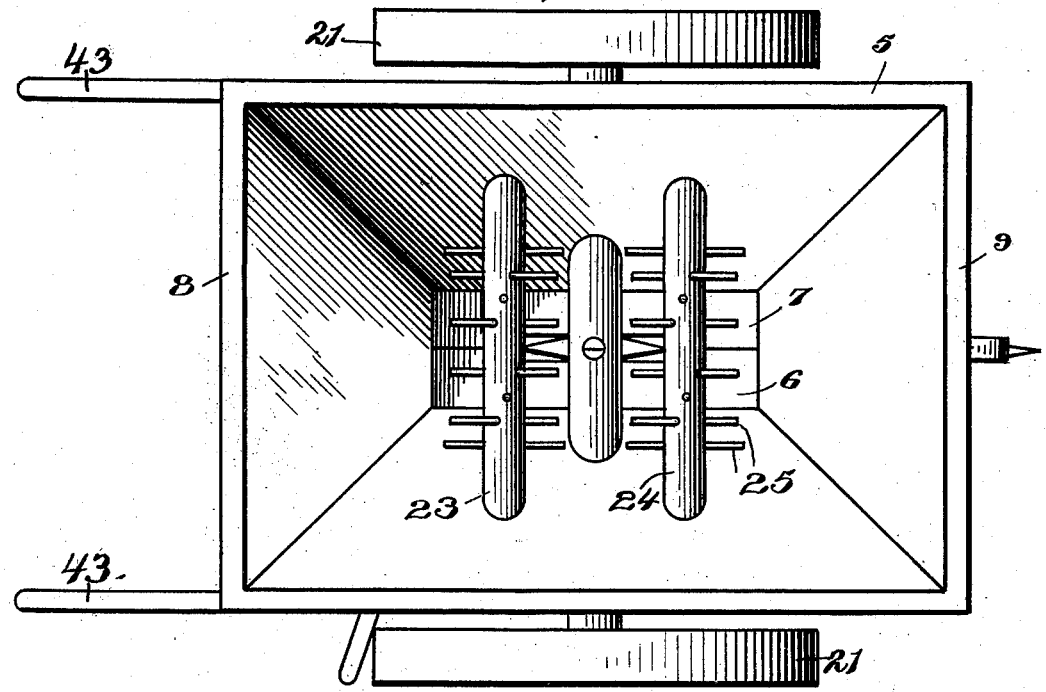
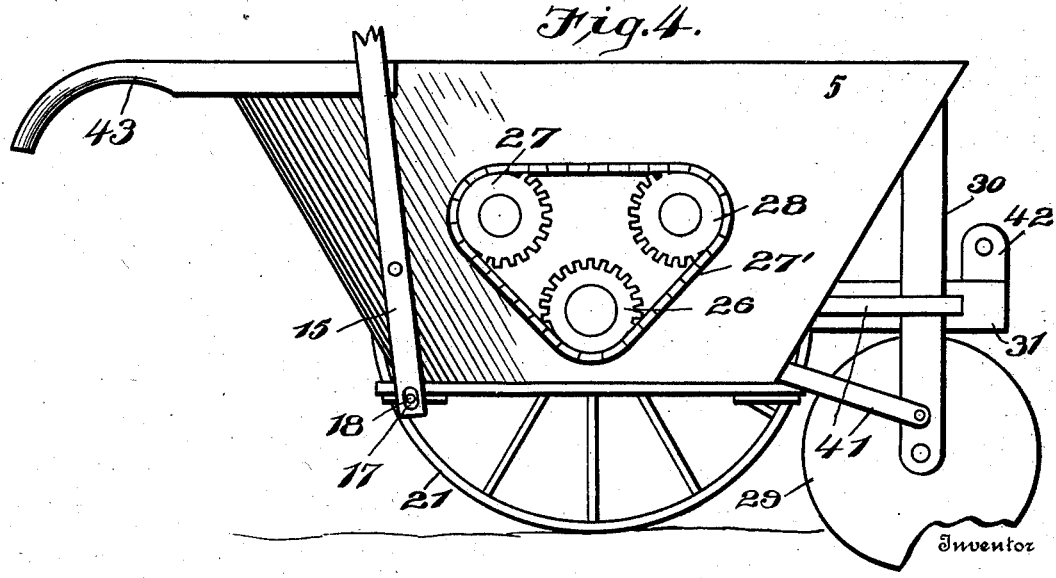

No. 748,549. PATENTED DEC. 29, 1903.
W. N. WHITE.
FERTILIZER DRILL.
APPLICATION FILED DEC. 26, 1902.
NO MODEL. 2 SHEETS—SHEET 2.
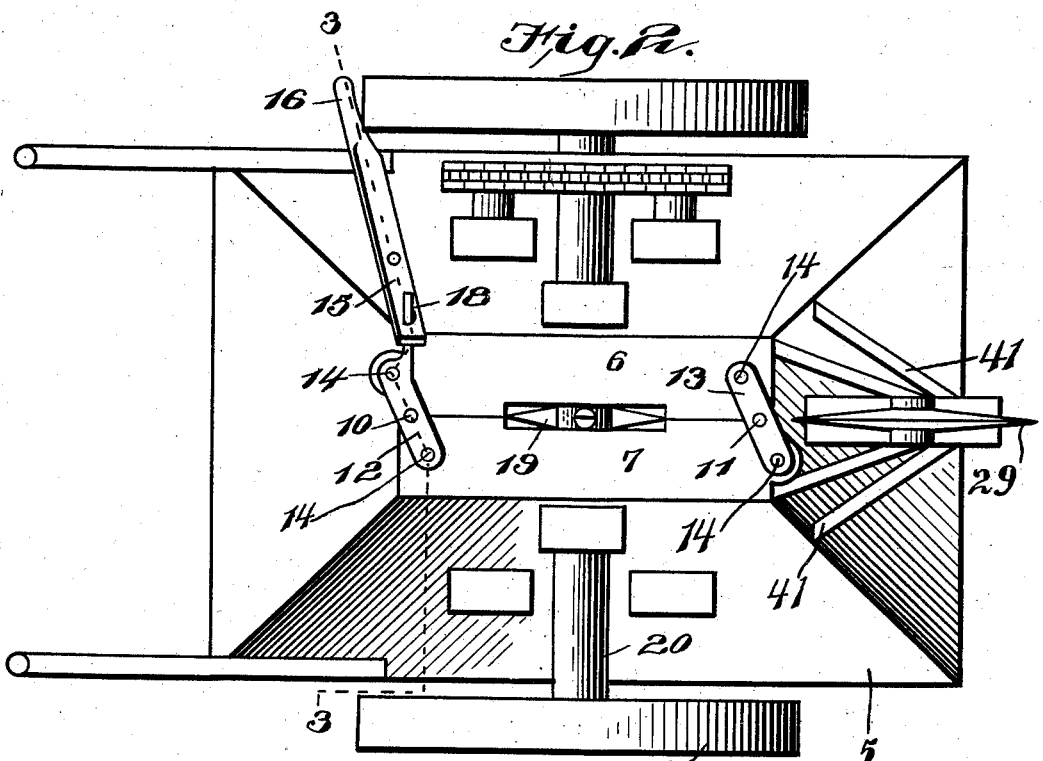
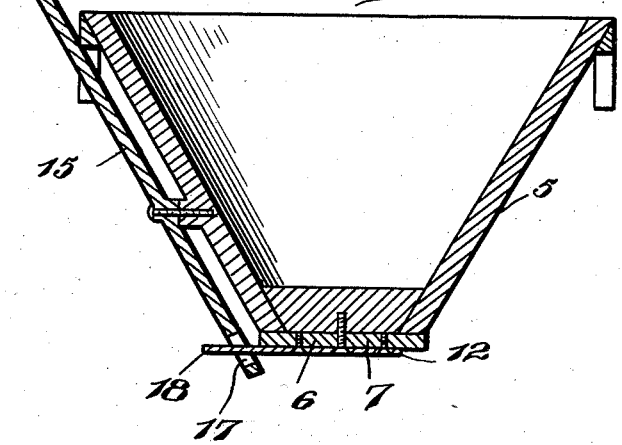
Witnesses
Inventor
W. N. White,
By Chandler & Chandler.
Attorneys No. 748,549.

Patented December 29, 1903.

UNITED STATES PATENT OFFICE.

WILLIAM N. WHITE, OF VILLANOW, GEORGIA.

FERTILIZER-DRILL.

SPECIFICATION forming part of Letters Patent No. 748,549, dated December 29, 1903.

Application filed December 26, 1902. Serial No. 136,697. (No model.)

*To all whom it may concern:*

Be it known that I, WILLIAM N. WHITE, a citizen of the United States, residing at Villanow, in the county of Walker, State of Georgia, have invented certain new and useful Improvements in Fertilizer-Drills; and I do hereby declare the following to be a full, clear, and exact description of the invention, such as will enable others skilled in the art to which it appertains to make and use the same.

This invention relates to fertilizer distributers or drills; and it has for its object to provide an implement of this nature from which the fertilizer will be automatically discharged as the implement progresses, and the rate of which discharge may be varied as desired.

In the drawings forming a portion of this specification, and in which like numerals of reference indicate similar parts in the several views, Figure 1 is a top plan view of a fertilizer-distributer embodying the present invention. Fig. 2 is a bottom plan view of the fertilizer-distributer. Fig. 3 is a vertical section through the implement on the line 3 3 of Fig. 2. Fig. 4 is a side elevation of Fig. 1.

Referring now to the drawings, the present implement comprises a body portion 5 in the form of a downwardly-tapered hopper, the bottom of which is formed by the separate boards or plates 6 and 7, the mutually adjacent edges of which are cut away at points midway of their ends to permit of feed of fertilizer from the hopper between the plates.

Engaged with the lower faces of the ends 8 and 9 of the hopper are pins or spindles 10 and 11, on which are pivotally mounted links 12 and 13, the ends of which are pivoted to the plates 6 and 7 by means of pins 14, these links being so positioned that when moved pivotally in one direction upon the pins 10 and 11 the plates 6 and 7 will be swung apart, and when moved in the opposite direction said plates will be brought together. To effect this movement of the plates, at which time they also have a slight longitudinal movement, a lever 15 is provided and is pivoted to the side of the hopper, the upper end of the lever having a handle 16, which projects above the hopper, while the lower end of the lever has an opening 17, in which is loosely received the extension 18 of the link 12. The handle 16 may be grasped to rock the lever 15, at which time the link 12 will be actuated pivotally to shift the plates 6 and 7 to vary the width of the feed-opening therebetween.

To prevent clogging of the fertilizer in the feed-opening, a stirrer is provided and consists of the radiating fingers 19, carried by the axle 20, which is passed transversely through the hopper, and is provided with ground-wheels 21, fixed upon its end.

Additional stirrers are provided and consist of shafts 23 and 24, which are journaled transversely of the hopper in a common plane above the axle and project through the sides of the hopper, each of these shafts having a spiral series of radiating fingers 25.

Upon the axle exterior to the hopper is a sprocket-wheel 26, and other sprocket-wheels 27 and 28 are fixed upon the shafts, and engaged with these sprocket-wheels is a chain 27, so that all of the stirrers will be simultaneously operated.

In order to open a furrow into which the fertilizer is to be deposited instead of being distributed broadcast, a disk 29 is provided and is rotatably mounted between the lower ends of arms 30, secured to the side faces of the beam 31, which projects forwardly from the hopper and is held against lateral displacement by the braces 41. Upon the forward end of the beam is a post 42, which is perforated to receive draft appliances, and attached to the rear portions of the sides of the hopper are the handles 43. With this construction it will be seen that as the implement advances the stirrers will be operated to insure a discharge of fertilizer and that the proper quantity of fertilizer discharged or the rate of discharge may be easily varied by manipulation of the hand-lever, which is conveniently arranged, as shown.

In practice modifications of the specific construction shown may be made and any suitable materials and proportions may be used for the various parts without departing from the spirit of the invention.

What is claimed is—

A fertilizer-drill comprising a hopper having a plurality of pairs of alining perforations in the sides thereof, a shaft passed through a pair of the alining perforations and having supporting-wheels mounted upon the ends thereof and having agitating-fingers arranged thereon within the hopper, other shafts disposed with their ends in the remaining pairs of perforations and extending outwardly of the hopper, said shafts having agitating-fingers mounted thereon, sprockets mounted upon the shafts exteriorly of the hopper, an endless chain connecting the sprockets, an opening in the bottom of the hopper, an arm pivoted at either end of the opening midway of the length of said arm, a pair of parallel plates pivoted at either end to the ends of the arms and a lever pivoted to the side of the hopper and to one end of one of the arms to move said arm upon its pivot and vary the distance between the plates.

In testimony whereof I affix my signature in presence of two witnesses.

WILLIAM N. WHITE.

Witnesses:
  J. P. WOOD,
  J. W. MILLER.